United States Patent
Chang

(10) Patent No.: US 7,206,928 B2
(45) Date of Patent: Apr. 17, 2007

(54) SYSTEM BOOT METHOD

(75) Inventor: Christopher Chang, Medfield, MA (US)

(73) Assignee: DIGI International Inc., Minnetonka, MN (US)

( * ) Notice: Subject to any disclaimer, the term of this patent is extended or adjusted under 35 U.S.C. 154(b) by 95 days.

(21) Appl. No.: 10/454,388

(22) Filed: Jun. 3, 2003

(65) Prior Publication Data

US 2004/0250056 A1 Dec. 9, 2004

(51) Int. Cl.
*G06F 9/24* (2006.01)
(52) U.S. Cl. .......................................... 713/1
(58) Field of Classification Search ............... 713/1
See application file for complete search history.

(56) References Cited

U.S. PATENT DOCUMENTS

| | | | |
|---|---|---|---|
| 4,654,783 A * | 3/1987 | Veres et al. .................... | 713/2 |
| 5,042,004 A | 8/1991 | Agrawal et al. | |
| 5,418,960 A * | 5/1995 | Munroe ......................... | 713/1 |
| 5,713,009 A * | 1/1998 | DeRosa et al. ................ | 713/2 |
| 5,781,492 A | 7/1998 | Gittinger et al. | |
| 5,884,067 A * | 3/1999 | Storm et al. ................. | 345/533 |
| 5,951,685 A * | 9/1999 | Stancil .......................... | 713/2 |
| 6,058,474 A | 5/2000 | Baltz et al. | |
| 6,088,755 A * | 7/2000 | Kobayashi et al. ........... | 710/300 |
| 6,088,783 A * | 7/2000 | Morton ......................... | 712/22 |
| 6,092,146 A * | 7/2000 | Dell et al. ...................... | 711/5 |
| 6,102,963 A | 8/2000 | Agrawal | |
| 6,538,468 B1 | 3/2003 | Moore | |
| 6,938,127 B2 * | 8/2005 | Fletcher et al. ............. | 711/141 |
| 2002/0087855 A1 | 7/2002 | Dykes et al. | |

OTHER PUBLICATIONS

Infineon Technologies product brief, TC11IB Highly Integrated 32 Bit Microcontroller, published by Infineon Technologies AG (2 pages).

Fairchild Semiconductor™ NM25C040 4K-Bit Serial CMOS EEPROM (Serial Peripheral Interface (SPI) Synchronous Bus), www.fairchildsemi.com, © 1999 Fairchild Semiconductor Corporation, Mar. 1999 (10 pages).

Texas Instruments TMS320VC5421 Fixed-Point Digital Signal Processor Data Manual, Literature No. SPRS098C, Dec. 1999-Revised Nov. 2001 (2 pages).

Infineon Technologies Boot ROM Code, TC11IB Microcontrollers, AP3230, Application Note V 1.0, Feb. 2002, (43 pages).

Texas Instruments TMS320VC5421 Bootloader Technical Reference, Application Report SPRA628A—Mar. 2002, Tai Nguyen, Bill Winderweedle (14 pages).

* cited by examiner

*Primary Examiner*—Rehana Perveen
*Assistant Examiner*—Eric Chang
(74) *Attorney, Agent, or Firm*—Kenneth F. Kozik; Holland & Knight LLP

(57) ABSTRACT

A method includes powering up a system with a system control circuitry (SCC) that contains a central processing unit (CPU). The method includes holding the CPU in a reset condition. The method also includes retrieving, over a serial data bus using a serial communications protocol, information about a system memory configuration and a boot program from a first section of a programmable read only memory (PROM). The method also includes retrieving, over a serial data bus using a serial communications protocol, a first portion of the boot program from a second section of the PROM using the information about the system memory configuration and the boot program, writing the first portion of the boot program into a system memory, releasing the CPU from the reset condition, and booting the system using the boot program.

24 Claims, 4 Drawing Sheets

SYSTEM BOOT METHOD

TECHNICAL FIELD

This invention relates to system boot.

BACKGROUND

Booting a computer system generally refers to loading an operating system (O/S) into the computer's main memory or random access memory (RAM). Once the operating system is loaded, the operating system is ready for users to run applications. Generally, read only memory (ROM) modules are used for initial program loading of computer systems by loading a very small program into the computer from a boot ROM and then giving that small program control so that the small program loads the entire operating system from some other memory storage device, such as a disk drive. This occurs by designing a Central Processing Unit (CPU) of the computer to begin fetching code from a pre-specified address in the boot ROM after the CPU is released from a powered-up reset or released from other reset conditions. These boot ROMs are generally internal to the computer system. In the case of computer systems for embedded control applications, a small operating system as well as a small programmable application can be stored in an uncompressed form in a programmable read only memory (PROM). In this case, the embedded computer system simply boots up by executing the operating system as well as the application programs directly from the PROM. In another example, a larger operating system and a larger programmable application are stored in a compressed form in a PROM. The CPU follows instructions in a section of the PROM to load the operating system and application program into a RAM based system memory, then to uncompress the operating system and application program in RAM, and then the CPU executes instructions from the uncompressed operating system and application program that are stored in the RAM.

SUMMARY

According to one aspect of the invention, a method includes powering up a system with a system control circuitry (SCC) that contains a Central Processing Unit (CPU). The method includes holding the CPU in a reset condition. The method also includes retrieving, over a serial data bus using a serial communications protocol, information about a system memory configuration and a boot program from a first section of a first programmable read only memory (PROM). The method also includes retrieving, over a serial data bus using the serial communications protocol, a first portion of the boot program from a second section of the first PROM using the information about the system memory configuration and the boot program, writing the first portion of the boot program into a system memory, releasing the CPU from the reset condition, and booting the system using the boot program.

Embodiments may include one or more of the following. The system can be a System on a Chip (SoC). The first PROM can be external to the system. The system does not include a boot ROM. The method can include retrieving, over the serial bus using the serial communications protocol, a second portion of the boot program from a second PROM using the information about system memory configuration and the boot program. The method can include writing the second portion of the boot program into the system memory. The second PROM can be external to the system. The serial communications protocol can be the serial peripheral interface (SPI) protocol. The serial communications protocol can be the Inter-Integrated Circuit (I2C) protocol. The system memory can include random access memory (RAM). The RAM can include dynamic random access memory (DRAM). The RAM can include synchronous dynamic random access memory (SDRAM).

A serial boot hardware holds the CPU in the reset condition, retrieves the information about the system memory configuration and the boot program, retrieves the first portion of the boot program, writes the boot program to the system memory, and releases the CPU from the reset condition. The serial boot hardware can be internal to the system. Writing the first portion of the boot program into the system memory further can include converting the first portion from a serial data format to a parallel data format. The method can include transferring the first portion in the parallel data format across a system bus to the DMA module that writes the first portion to the memory controller using direct memory access (DMA) and then transferring the first portion from the memory controller to the system memory.

According to another aspect of the invention, a system includes a serial boot hardware, a memory controller that controls a system memory, a Data Memory Access (DMA) module with access to the memory controller, a system bus connecting the serial boot hardware and the DMA module, a SCC with access to the memory controller, a CPU contained in the SCC, a reset line connecting the serial boot hardware and the CPU, and a first PROM. The system also includes a serial data bus connecting the first PROM and the serial boot hardware. The serial boot hardware is configured, at a beginning of a power up state, to hold the CPU in a reset condition and retrieve, over the serial data bus using a serial communications protocol, information about a system memory configuration and a boot program from a first section of the first PROM. The serial boot hardware is further configured to use the information about the system memory configuration and the boot program to retrieve, over the serial data bus using a serial communications protocol, a first portion of the boot program from a second section of the first PROM and transfer the first portion to the DMA module that writes the first portion into the system memory. The serial boot hardware is further configured to release the CPU from the reset condition which enables the system to boot by reading the system memory.

Embodiments may include one or more of the following. The serial boot hardware, the DMA module, the memory controller, the system bus, the SCC, the input/output ports, and the reset line can be physically implemented as a System on a Chip (SoC). The first PROM can be external to the system. The system does not include a boot ROM. The serial boot hardware can be further configured to retrieve, over the serial data bus using the serial communications protocol, a second portion of the boot program from a second PROM using the information about the system memory configuration and the boot program. The serial boot hardware can be further configured to transfer the second portion of the boot program to the DMA module that can be configured to write the second portion of the boot program into the system memory using DMA. The second PROM can be external to the system. The serial communications protocol can be the serial peripheral interface (SPI) protocol. The serial communications protocol can be the Inter-Integrated Circuit (I2C) protocol. The system memory can include random access memory (RAM). The RAM can include dynamic random access memory (DRAM). The RAM can include synchronous dynamic random access memory (SDRAM).

The serial boot hardware can be internal to the system. The serial boot hardware can be further configured to convert the first portion from a serial data format to a parallel data format. The serial boot hardware can be further configured to transfer the first portion in the parallel data format across a system bus to the DMA module that can be configured to write the first portion to the memory controller using direct memory access (DMA). The memory controller can be configured to write the first portion to the system memory.

One or more of the following advantages can be provided by one or more aspects of the invention.

The boot-up process, by using serial PROMs, enables a system to be tailored to a particular application by providing the ability to swap out the serial PROMs and flexibly interface them to the system. First, different users of the system can program serial PROMs with boot-up programs with different sizes for different applications and interface these serial PROMs to the system. The format of the PROM allows system design flexibility for different applications and different system requirements. The memory contents in the PROM can be configured differently for these different users and these users simply specify the system memory configuration and boot program information in the first section of the PROM. Second, the cabling for serial communications between the serial boot hardware and the serial PROMs uses less wires than parallel forms of communications so there is flexibility in physically interfacing the serial PROMs to the serial boot hardware.

Using a serial PROM instead of a parallel PROM to boot the system results in a cheaper implementation because a serial PROM costs less than a parallel PROM.

The boot-up process requires no internal boot ROM in the system. The internal boot ROM cost is significant to the cost of the system so the system is cheaper.

Other features, objects, and advantages of the invention will be apparent from the description and drawings, and from the claims.

DETAILED DESCRIPTION

Figure 1:
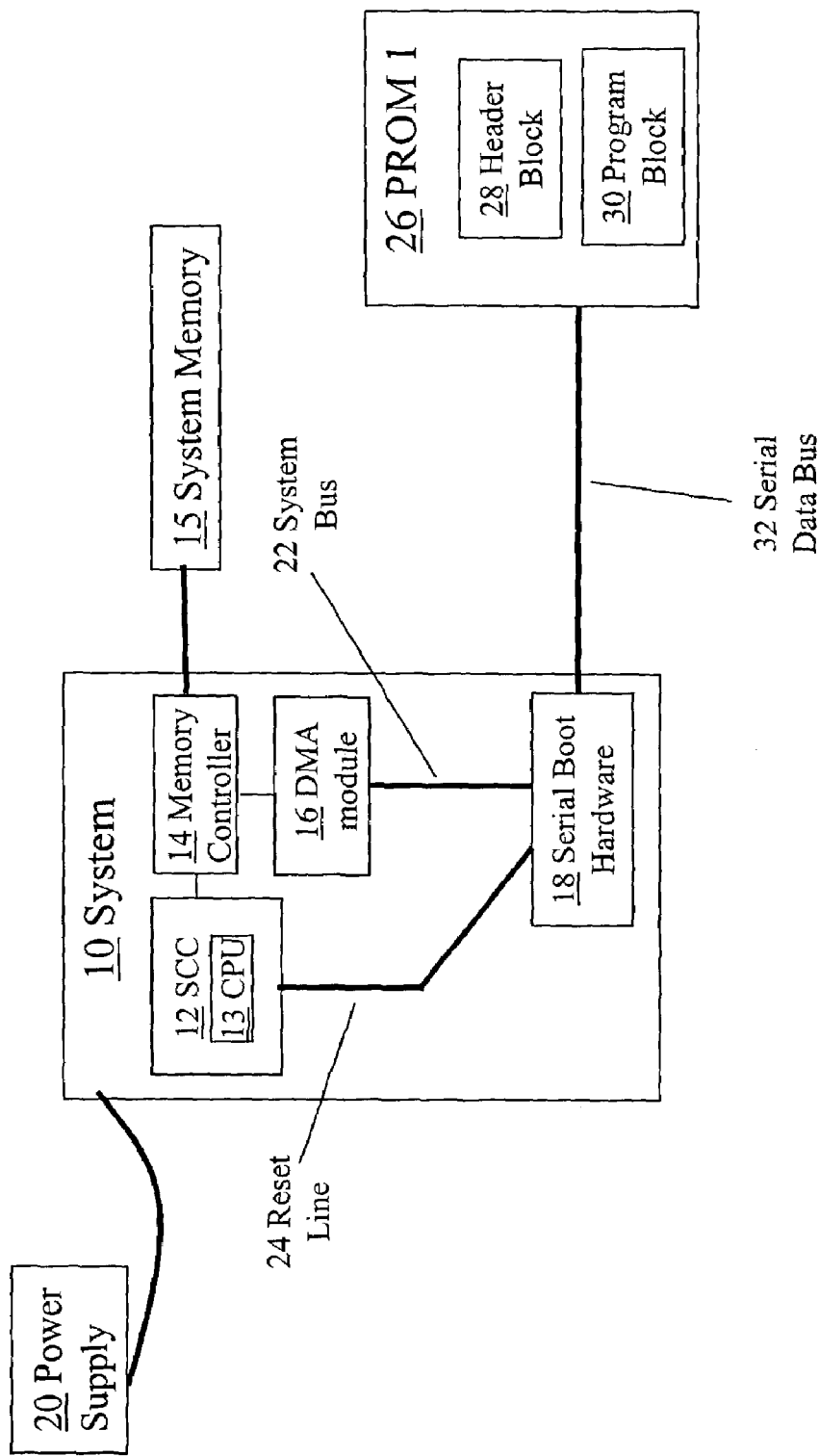
FIG. 1 is a system with a PROM.

In FIG. 1, system 10 includes system control circuitry (SCC) 12, Central Processing Unit (CPU) 13 included in SCC 12, memory controller 14 that controls system memory 15, direct memory access (DMA) module 16, and serial boot hardware 18. Power supply 20 supplies power to system 10. System bus 22 connects serial boot hardware 18 with DMA module 16. Serial boot hardware 18 can hold CPU 13 in a reset mode or release CPU 13 from reset mode by asserting or not asserting reset line 22. While in reset mode, CPU 13 does not execute any instructions in system memory 15. Subsequent to being released from reset mode, CPU 13 reads system memory 15 at a pre-specified address to get instructions and then executes these instructions.

System memory 15 includes Random Access Memory (RAM), such as Dynamic RAM (DRAM) or Synchronous DRAM (SDRAM). SCC 12 can read from and write to system memory 15 through memory controller 14. In some implementations, system 10 is contained in a single semiconductor chip, commonly known as a System on a Chip (SoC). SoC technology is the packaging of all the necessary electronic circuits and parts for a "system" (such as a cell phone or digital camera) on a single integrated circuit (IC), generally known as a microchip. For example, a system-on-a-chip for a sound-detecting device might include an audio receiver, an analog-to-digital converter (ADC), a microprocessor, necessary memory, and input/output logic control for a user—all on a single microchip.

Serial boot hardware 18 communicates with serial programmable read only memory (PROM) 26 using serial data bus 32. Serial boot hardware 18 cooperates with DMA module 16 to load a boot program into system memory 15 from serial PROM 26 that contains a boot program (not shown). This boot program can include instructions to begin executing an operating system as a "boot-up process" on system 10. The boot-up process executes upon system initiation or after a cold or warm start. After the boot-up process is complete, SCC 12 is ready to execute other instruction sets to satisfy a variety of computational tasks. Serial PROM 26 is divided into header block 28 that stores system memory configuration in addition to boot program information and program block 30 that stores the boot program. Boot program information enables correct reading of the boot program by serial boot hardware 18 and includes a total length of the boot program, a size of serial PROM 26, and other pertinent boot information. System memory configuration enables correct writing of the boot program into system memory and includes system memory type, system memory chip organization, system memory timing, and DMA module configuration data. These elements of the system memory configuration and boot program information are stored in a fixed order in serial PROM 26 to facilitate easy reading by serial boot hardware 18. This system memory configuration and boot program information is important because system memory 15 and serial PROM 26 are external to the chip and system memory 15 as well as the contents of serial PROM 26 can be configured in different ways. In this way, the design of system memory 15 and the contents of serial PROM 26 are only limited by memory controller functions in system 10.

Serial boot hardware 18 communicates with serial PROM 26 using, for example, the Serial Peripheral Interface (SPI) serial data bus standard on serial data bus 32. A serial data bus standard specifies how two or more computational devices serially transmit data to one another on a bus. In serial data transmission, the techniques of time division and space division are used, where time separates the transmission of individual bits of information sent serially and space (on multiple lines or paths) can be used to have multiple bits sent in parallel. A serial data bus typically uses less data lines than a parallel data bus. Thus, using a serial data bus to connect system 10 with external serial PROM 26 takes less physical room than to connect system 10 with, for example, a parallel data bus. For some implementations, this means that a product in the form of system 10 is more adaptable to different user applications by booting system 10 from a serial PROM instead of a parallel PROM because the physical connections to the serial PROM are smaller. This same advantage also applies to booting system 10 from multiple serial PROMs.

The serial peripheral interface (SPI) is a serial data bus standard and SPI interfaces are available for microprocessors such as the MPC 8260 and microcontrollers such as M68HC11 that are available from Motorola, Inc. of Schaumburg, Ill. SPI interfaces are also provided on serial PROM products such as NM25C040 that is available from Fairchild Semiconductor, Inc. of South Portland, Me. The SPI circuit is a synchronous serial data link that is standard across many microprocessors and other peripheral chips. The SPI circuit provides support for high bandwidth network connection among SoCs and other devices supporting SPI. The SPI serial bus standard is designed for applications that are considered data streams. Common examples of "data stream" applications include data communication between microprocessors or digital signal processors (DSPs) and data transfer from analog-to-digital converters. SPI devices communicate using a master-slave relationship, in which the master initiates the data frame. When the master generates a clock and selects a slave device, data can be transferred in either or both directions simultaneously.

Figure 2:
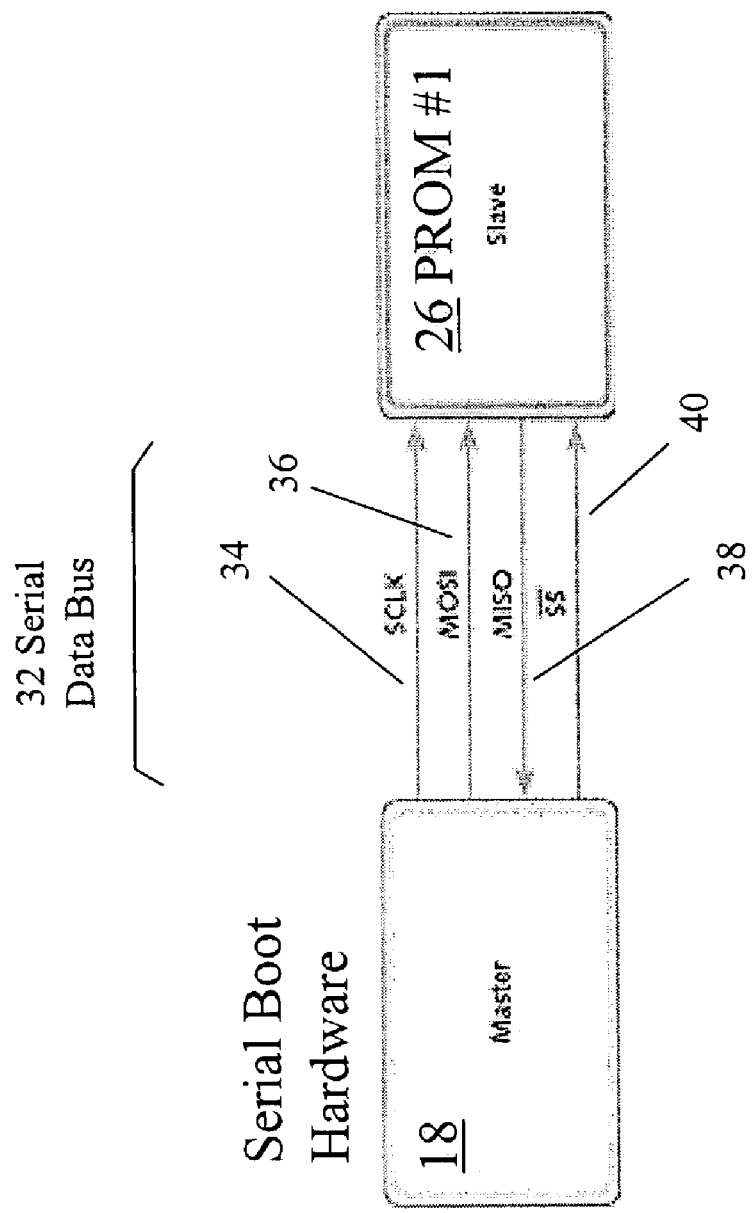
FIG. 2 is a schematic of the SPI serial communications setup between a system and a serial PROM.

SPI specifies four signals, i.e., clock (SCLK) 34, master data output and slave data input (MOSI) 36, master data input and slave data output (MISO) 38, and slave select (SS) 40. FIG. 2 shows these signals between serial boot hardware 18 (the master) and serial PROM 26 (the slave) in a single slave configuration. SCLK 34 is generated by the serial boot hardware 18 and input to serial PROM 26. MOSI 36 carries data from serial boot hardware 18 to serial PROM 26. Serial PROM 26 is notified to respond to signals 34, 36, 38 when serial boot hardware 18 asserts SS 40 signal.

In other examples, serial boot hardware 18 communicates with serial PROM 26 using the standard Inter-Integrated Circuit (I²C) serial bus standard.

Depending on the application, the boot program for system 10 can be larger than the storage capacity for one PROM, such as serial PROM 26. In this case, extra serial PROMs can be "daisy chained" together to provide extra storage capacity to store the boot program. Serial bus standards such as SPI and I²C facilitate this type of daisy-chaining.

Figure 3:
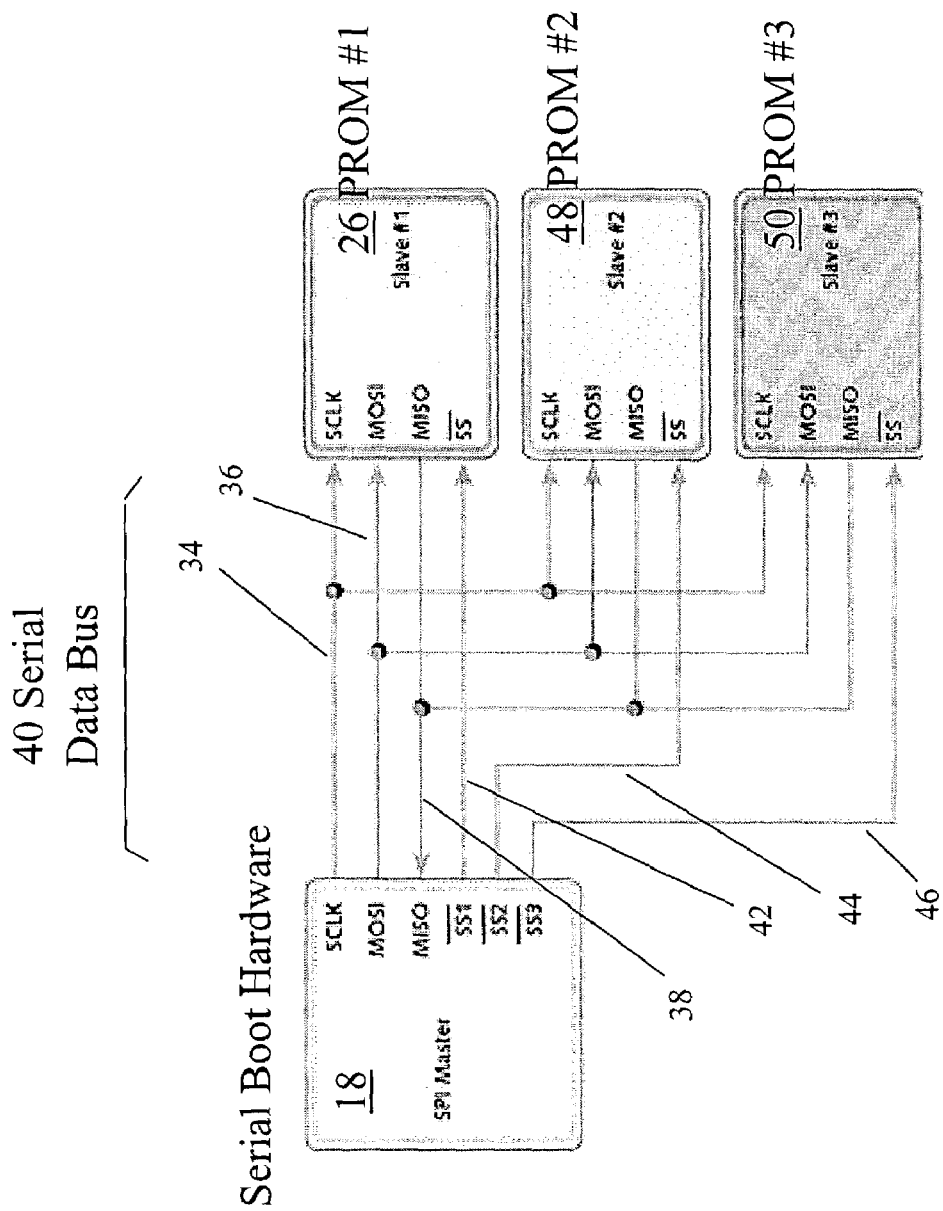
FIG. 3 is a schematic of the SPI serial communications setup between a system and three serial PROMs.

In FIG. 3, serial boot hardware 18 reads a boot program from three serial PROMs 26, 48, 50 using the SPI serial bus standard with serial data bus 40. Serial boot hardware 18 asserts line 42 to select lines 34, 36, 38 to communicate with serial PROM 26. Serial boot hardware 18 asserts line 44 to select lines 34, 36, 38 to communicate with serial PROM 48. Serial boot hardware 18 asserts line 46 to select lines 34, 36, 38 to communicate with serial PROM 50. In the boot process using serial data bus 40, serial boot hardware 18 first asserts line 42 to read header block 28 from serial PROM 26 and then to read a first portion of the program block from serial PROM 26. Next, serial boot hardware 18 asserts line 44 to read a second portion of the program block from serial PROM 48. Lastly, serial boot hardware 18 asserts line 46 to read a third portion of the program block from serial PROM 50.

In other examples, serial boot hardware 18 communicates with serial PROMs 26, 48, 50 using the standard Inter-Integrated Circuit (I2C) serial bus standard.

Figure 4:
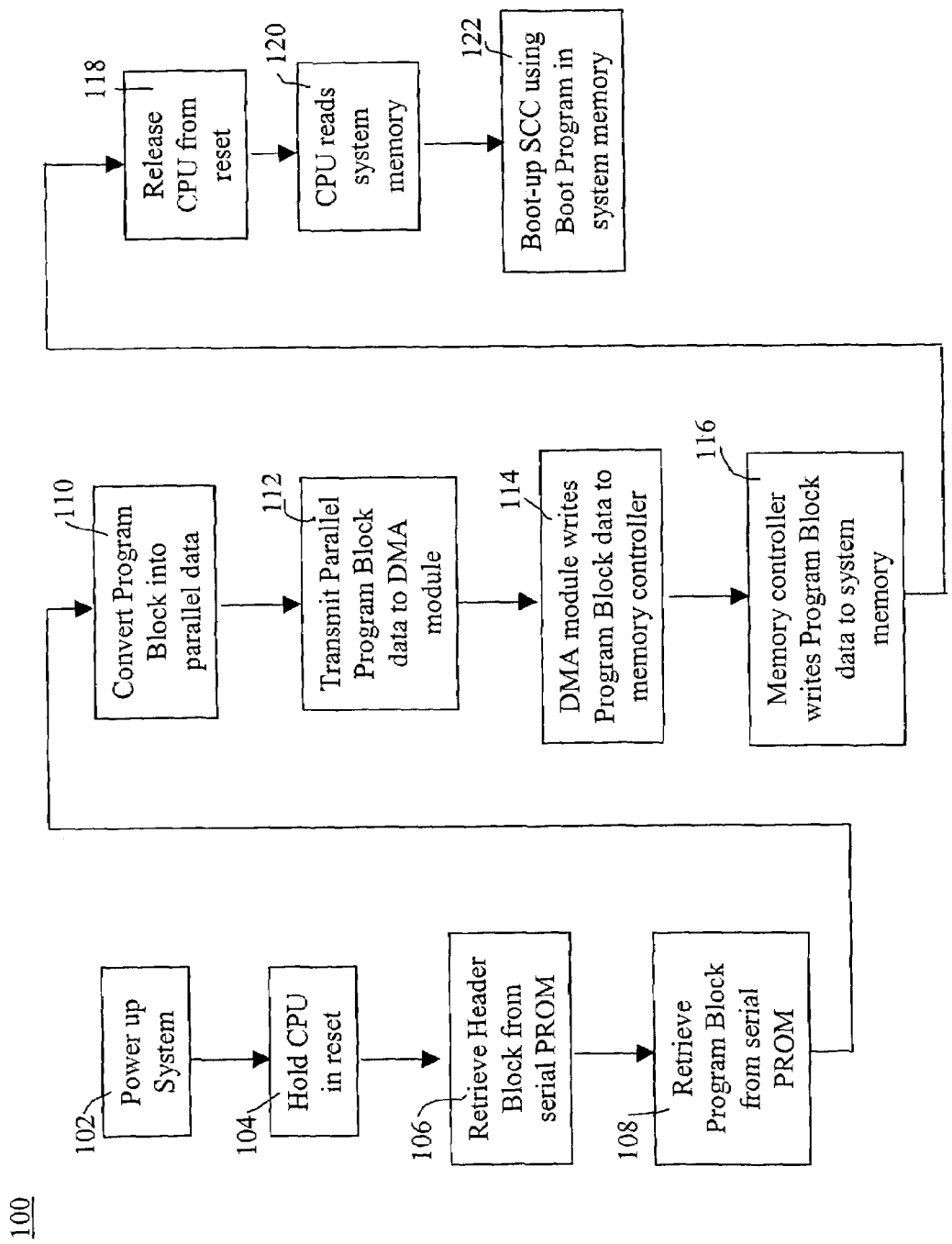
FIG. 4 is a process for booting up a system from one or more serial PROMs.

In FIG. 4, process 100 enables system 10 to boot up from data stored in one or more serial PROMs that are external to system 10. Process 100 allows system 10 to boot up solely from these external serial PROMs without using a boot ROM that is internal to system 10.

Power supply 8 powers (102) up system 10. Serial boot hardware 18 holds (104) CPU 13 in reset mode. Serial boot hardware 18 retrieves (106) header block 28 from a first serial PROM. Serial boot hardware 18 retrieves (108) a first portion of the program block from the first serial PROM using a serial data bus. If there are portions of the program block in addition to this first portion, serial boot hardware 18 retrieves (108) these other portions of the program block from other serial PROMs using the serial data bus. Serial boot hardware 18 uses information in the header block 28 to retrieve (108) the portions of the program block from one or more serial PROMs. Serial boot hardware 18 converts (110) the program block from serial form into parallel form. Serial boot hardware 18 transmits (112) the parallel program block data across system bus 22 to DMA module 16. DMA module 16 writes (114) the parallel form of the program block data to memory controller 14. Memory controller 14 writes (116) the parallel program block data into system memory 15 starting at a pre-specified address. Typically, this pre-specified address is address 0. Serial boot hardware 18 releases (118) CPU 13 from reset mode. CPU 13 reads (120) the program block data in system memory 15 through memory controller 14 starting at the pre-specified address. SCC 12 boots up by executing (122) the instructions in the program block data or boot program.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
    powering up a system on a chip (SoC) with a system control circuitry (SCC) that contains a central processing unit (CPU);
    holding the CPU in a reset condition;
    using a serial boot hardware, with no CPU and firmware involvement, to configure the system to interface with various system memory architectures including random memory types and organizations;
    retrieving, over a serial data bus using the serial boot hardware and a serial communications protocol, information about a system memory configuration and a boot program from a first section of a first serial programmable read only memory (PROM);
    retrieving, over a serial data bus using the serial boot hardware and the serial communications protocol, a boot program from a second section of the first serial PROM using the information about the system memory configuration and the boot program;
    writing the boot program into a system memory that is external to the SoC;
    releasing the CPU from the reset condition; and
    booting the SoC using the boot program.

2. The method of claim 1 wherein the first serial PROM is external to the SoC.

3. The method of claim 1 further comprising retrieving, over the serial data bus using the serial communications protocol, a boot program from the second section of the first serial PROM using the information about the boot program retrieved from the first section of the serial PROM.

4. The method of claim 1 further comprising writing the boot program into the system memory using the hardware sequencer and a direct memory access (DMA) module.

5. The method of claim 1 wherein the external serial PROM is more than a single device.

6. The method of claim 1 wherein the serial communications protocol is the serial peripheral interface (SPI) protocol.

7. The method of claim 1 wherein the serial communications protocol is the Inter-Integrated Circuit (I²C) protocol.

8. The method of claim 1 wherein the system memory comprises random access memory (RAM).

9. The method of claim 8 wherein the RAM comprises dynamic random access memory (DRAM).

10. The method of claim 8 wherein the RAM comprises synchronous dynamic random access memory (SDRAM).

11. The method of claim 1 wherein writing the boot program into the system memory further comprises converting the boot program from a serial data format to a parallel data format.

12. The method of claim 11 further comprising transferring the boot program in the parallel data format across a system bus to a memory controller using direct memory access (DMA) and then transferring the boot program from the memory controller to the system memory.

13. A system comprising:
a system on a chip (SoC), the SoC comprising a serial boot hardware, a memory controller that controls a system memory, a Direct Memory Access (DMA) module with access to the memory controller, a SCC with access to the memory controller, a CPU contained in the SCC, a system bus connecting the serial boot hardware, the SCC and the DMA module, and a reset line connecting the serial boot hardware and the CPU;
a first serial PROM;
a serial data bus connecting the first serial PROM and the serial boot hardware, the serial boot hardware configured, at a beginning of a power up state, to hold the CPU in a reset condition, retrieve, over the serial data bus using a serial communications protocol, information about a system memory configuration and a boot program from a first section of the first serial PROM, use the information about the system memory configuration and boot program to configure the system and to retrieve, over the serial data bus using the serial communications protocol, a boot program from a second section of the first serial PROM and transfer the boot program to the DMA module that is configured to write the boot program first portion into the system memory, and the serial boot hardware is further configured to release the CPU from the reset condition which enables the system to boot by reading the system memory, wherein the serial boot hardware, with no CPU and firmware involvement, configures the system to interface with various system memory architectures including random memory types and organizations;
the system memory including Random Access Memory (RAM); and
a system memory bus that connects RAM to the memory controller.

14. The system of claim 13 wherein the first serial PROM is external to the system.

15. The system of claim 13 wherein the serial boot hardware is further configured to retrieve, over the serial bus using the serial communications protocol, a second portion of the boot program from a second PROM using the information about system memory configuration and the boot program.

16. The system of claim 15 wherein the serial boot hardware is further configured to transfer the second portion of the boot program to the DMA module that is configured to write the second portion into the system memory using DMA.

17. The system of claim 13 wherein the serial communications protocol is the serial peripheral interface (SPI) protocol.

18. The system of claim 13 wherein the serial communications protocol is the Inter-Integrated Circuit (I²C) protocol.

19. The system of claim 13 wherein the RAM comprises dynamic random access memory (DRAM).

20. The system of claim 13 wherein the RAM comprises synchronous dynamic random access memory (SDRAM).

21. The system of claim 13 wherein the serial boot hardware is internal to the system.

22. The system of claim 13 wherein the serial boot hardware is further configured to convert the boot program from a serial data format to a parallel data format.

23. The system of claim 22 wherein the serial boot hardware is further configured to transfer the boot program in the parallel data format across the system bus to the DMA module that is further configured to write the boot program to the memory controller using DMA.

24. The system of claim 23 wherein the memory controller is configured to transfer the boot program to system memory.

* * * * *